Figure 1:
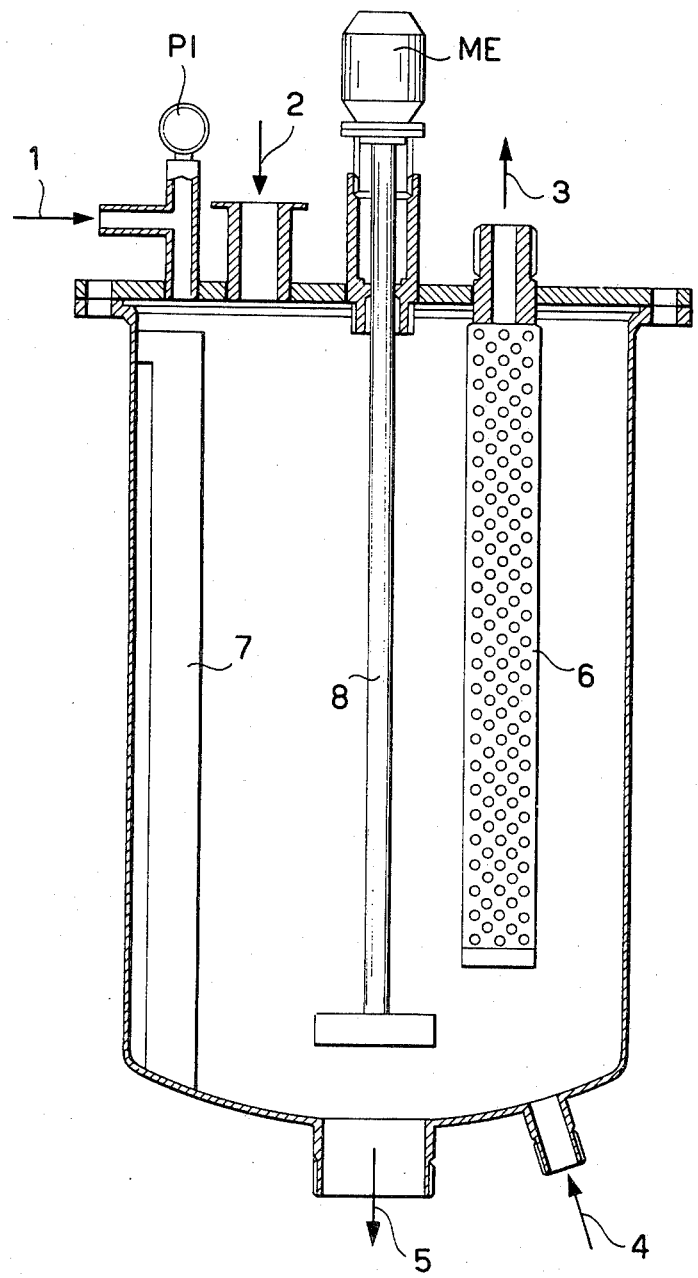

United States Patent [19]

Emmi et al.

[11] 4,387,110

[45] Jun. 7, 1983

[54] METHOD AND APPARATUS FOR SOLID-LIQUID EXTRACTION STEPS

[75] Inventors: Egidio Emmi; Giancarlo Sodini, both of Rome, Italy

[73] Assignee: E.N.I. Ente Nazionale Idrocarburi, Rome, Italy

[21] Appl. No.: 280,299

[22] Filed: Jul. 6, 1981

Related U.S. Application Data

[63] Continuation of Ser. No. 38,231, May 11, 1979, abandoned.

[30] Foreign Application Priority Data

May 24, 1979 [IT] Italy .............................. 23720 A/78

[51] Int. Cl.³ .............................................. A23L 1/36
[52] U.S. Cl. .................................... 426/430; 210/634; 422/261
[58] Field of Search ....................... 422/261, 268, 292; 426/425, 430, 489, 507, 431; 210/413

[56] References Cited

U.S. PATENT DOCUMENTS

| | | |
|---|---|---|
| 3,365,065 | 1/1968 | Varjabedian .................... 210/413 X |
| 3,902,962 | 9/1975 | Reinhall ............................. 162/246 |
| 4,003,837 | 1/1977 | Osborne ......................... 210/413 X |
| 4,084,007 | 4/1978 | Hipp et al. ........................... 426/430 |
| 4,100,016 | 7/1978 | Diebold et al. ...................... 162/16 |
| 4,122,104 | 10/1978 | Witte .............................. 426/430 X |
| 4,148,928 | 4/1979 | Sodini et al. ........................ 426/430 |

*Primary Examiner*—Ferris H. Lander
*Attorney, Agent, or Firm*—George P. Hoare, Jr.

[57] ABSTRACT

For extracting undesirable components from vegetable tissues, more particularly from oil-bearing seeds having been stripped of the predominant fraction of their fatty components, a method is disclosed in which a number of serially arranged vessels equipped with stirring means is used in such a way that the materials to be treated are initially contacted by partially exhausted solvent and progressively with cleaner and cleaner solvent so that, when the solid materials are almost completely exhausted, they are washed with fresh solvent. The vessels are changed in rotational sequence, so that the system is continuous as regards the solvent and is discontinuous with respect to the solids.

6 Claims, 1 Drawing Figure

METHOD AND APPARATUS FOR SOLID-LIQUID EXTRACTION STEPS

This is a continuation of application Ser. No. 38,231 filed May 11, 1979, and now abandoned.

This invention relates to a method for the solid-liquid extraction which consists in treating a solid substance, from which a few components are to be extracted, with a solvent, or a mixture of two or more solvents through a number n, of serially arranged vessels, the latter being kept, during the entire extraction stage throughout, under a condition of constant stirring.

The solvent(s) are fed to and drawn from the several vessels at a specific value of the rate of flow, to be selected within a well determined range which is comprised between 2 and 15 m$^3$ per hour per m$^2$, the flow through the n vessels being continuous.

In practice, after having charged each vessel with the properly comminuted solids, each vessel is filled with the solvent and stirring is started.

Fresh solvent is then fed to the first extractor, so that the solvent contained therein is diluted and a very efficient extraction is carried out.

The solvent drawn from such a vessel is fed to the next extractor wherein the same operation is repeated and so forth for all the subsequent n extractors.

As soon as the solids of the first extractor have been exhausted, it is damped and fresh solvent is fed in, by connecting the vessel as the last of the series. The feed of fresh solvent is shifted from the first extractor to the next, and so forth.

Inasmuch as in each extractor about the 10% of the solids (i.e. the finest components) passes in the solvent stream, in addition to the extractor serial set a filter is required in which the separation of the portion of solids fluxed with the solvent is carried out and the extraction completed.

The practicability and the efficiency of the method are strictly correlated with a number of variables which must be, in their turn, correlated with each other.

As a basic parameter, it has already been indicated that the specific rate of flow of the solvent fed to and drawn from each extractor must lie in the range from 2 to 15 cubic meters per hour per square meter. Other parameters shall properly be selected, viz.: ratio of height to diameter of the vessel, geometrical configuration of the filtering member, size of the openings of the filtering member, material which composes the filtering member, thickness of the filtering member, kinematic viscosity of the slurry and intensity of stirring maintained in the vessel.

Everyone skilled in the art will be in a position to select the appropriate values of the parameters enumerated above in order to bring to an optimum the procedure and the efficiency of the extraction consistently with the solids to be treated, its size, the solvent and all other variables as the case may be.

As the present disclosure proceeds, reference will be had by way of example and on account of the Applicants' interest for the subject matter, to the particular extraction of lipids and undesirable substances so as to obtain flours and concentrates from edible vegetables.

It is apparent that the working details to be described hereinafter will not be such as to limit the scope of the invention thereto and the method of extraction, as outlined above, can be applied to other cases of solid-liquid extraction. The invention can be applied to the extraction of active principles contained in vegetable tissues, by using as the extractants both organic and aqueous solvents.

It is known that oil-bearing seeds, both those with a high contents of oil such as sunflower, peanut, cotton, and those which have a low contents of oil such as soybean, grapeseed, sesame, are used in the food industry, in the main, as source of lipids and the extraction cakes are used in the fodder industry.

Oil-bearing seeds are thus an important vegetable source of proteins having a high biological value and thus have a potential utility in human nutrition.

The exploitation of the proteins which are present in the vegetable seeds for alimentary use is severely hindered by the presence of inherent toxic and/or undesirable components such as phenols, fermentable sugars, digestion inhibitors, lignin and others, and by external factors due to the technological processing, such as decrease of the protein solubility, Maillard's reaction between sugars and proteins, condensation reaction between phenols and proteins and others.

Generally speaking, all of the seeds used for the preparation of proteinic products are not exempt from undesirable and/or toxic substances.

More particularly, proteinic meals from sunflower (a seed having a high contents of oil) coming from the industrial deoiling plants, cannot be used for human feed due to both the reasons set forth hereinabove.

In the latest years, methods have been suggested which provide for the extraction of toxic and/or undesirable substances from the defatted proteinic meals, and a revision has become imperative of the oil-extraction methods in order to offset the external causes which are responsible for the loss of a few basic properties of the extracted products.

As a matter of fact, the extraction cakes coming from the conventional oil extraction procedures have, as a rule, a high contents of crude fiber, a low NSI (Nitrogen Solubility Index) as a result of the high processing temperatures, and a biological impoverishment of the proteinic fraction.

In order that proteinic cakes may be obtained from oily seeds, susceptible of being used as a raw material for the conversion into products adapted for alimentary use, the first problem to be solved is to defat seeds having a low contents of crude fiber by a procedure which requires working temperatures below the temperature of denaturation of the proteins.

At present, processing schemes are not available which are capable of abiding by both the conditions mentioned above while simultaneously providing an economically acceptable process run.

The extraction of lipids is generally carried out in the following fashions:

pressing, extraction by a percolating solvent, extraction with a solvent by immersion, pressing followed by extraction with a solvent.

The methods of defatting by pressing and extraction with a percolating solvent imply the presence of inerts (crude fiber) in the product to be defatted in order to have a technologically practicable processing: the latter, inter alia, takes place at too high a temperature, especially in the case of pressing.

The extraction procedure recalled above is capable of defatting with a solvent seeds which have been even completely dehulled, the extraction solvent useups being comparable with those of the conventional installations for an equal amount of residual oil in the meal.

This method can be used also for the extraction with a solvent of toxic and/or undesirable components, starting both from seeds and from defatted meals. In addition, this procedure permits to extract simultaneous the oil and the toxic and/or undesirable components by using appropriate solvent mixtures, even starting from completely dehulled seeds.

An extraction assembly embodied on the basis of the method set forth above consists, as outlined above, of n vessels in which stirring means are provided and equipped with filtering members which, during progress of the extraction, are kept unobjectionably clean by the whirling motion induced by stirring.

The filtering members thus behave like liquid-phase screens rather than as sieves in the common acception.

The materials to be processed are fed, at preselected time intervals, to each vessel, in which they stay for the time which is required to perform the extraction. Such materials are fed-in in the form of a slurry which is previously prepared by admixing the materials with partially exhausted extraction solvent.

The solvent flows serially through the vessels in which stirring is provided, whereas the feed of fresh solvent is shifted from any vessel to its next at preselected time intervals.

Also the discharge of the treated solids takes place in rotational sequence from each vessel. The shift of feeds and discharges, both of the solids and the solvent, permits to bring about an apparent motion of the solids relative to the extraction solvent.

As a matter of fact, the materials to be processed are initially contacted by partially exhausted solvent and, progressively, they are contacted by cleaner and cleaner solvent until such time as they, now nearly completely extracted, are washed with fresh solvent. The process flow is continuous relative to the solvent while it is discontinuous relative to the solids.

The solid materials in the form of fine particulates is entrained by the solvent for extraction inasmuch it has been selected to have the filtering member acting as a screen (absence of cake) in order to keep to a minimum the solvent pressure drops through the vessel set. Such a material is collected on a filter and washed by the same extraction solvent. This can be done since, periodically, the concentration of the extraction solvent is decreased from a maximum value to a minimum.

At the termination of each period of collection on a filter and washing of the particulates, the solid cake which has been built up is recycled to the vessel which contained the incoming solid material.

This application of the method set forth above is characterized by the following values of the critical parameters which have been enumerated above, viz.:
  ratio of height to diameter of the vessel: from 0.5 to 1.5
  geometrical characteristics of the filtering member:
    mesh diameter of the filtering member: 1 to 200 microns
  material composing the filtering member: AISI, synthetic and vegetable fibers
  thickness of the filtering member: 1 to 100 microns
  kinematic viscosity of the slurry: 0.1 to 100 centistokes
  degree of stirring maintained in the vessel: 0.2 to 2 kilowatts per cubic meter ($kW/m^3$).

RAW MATERIALS

The sunflower seeds, cultivar Uniflor 70, were obtained from ISEA (Ancona, Italy) and manually dehulled, or dehulled according to the industrial procedure according to Bühler.

The soybean seeds, cultivar ADA, dehulled, were supplied by the Società Olii e Risi (Aprilia, Italy).

The oily seeds used herein for the extraction of lipids were milled with a Diefenbach Model L2/30/30 mill. Ethanol, food grade, was supplied by Orbat, Rome, Italy, and nor hexane was supplied by Rudi Pont. Pure chlorogenic acid (purity 97% and over) was from Fluke, AG, Bucks SG. The reagents for the chemical analyses were all of pure grade.

METHODS

The chemical analyses on the raw materials to be subjected to extraction and on the end products were made according to the standard methods. The AOAC (Association Official Analytical Chemists) methods, 12th Edition, 1975, were used for the following: moisture No. 14.004-Kjeldahl nitrogen No. 7.017-7021, Crude fiber: No. 7054-Ash No. 14006, sugars No. 14024-14025. The metering of total sugars, where specified, was according to Dubois et al., (1956), Anal. Chem., 28, 350.

The contents of nor hexane and ethanol as residues were determined according to Wan et al., (1977), J.A.O.C.S., 54, 542, using an HP model 5840A gas-chromatograph.

The method of AACC (American Association of Cereal Chemists), 1962, were used for metering the lipids No. 30-36.

Metering of lignin was effected by the Standard Methods of Chemical Analysis, 6th Edition, Volume II/B, page 1737.

The contents of cellulose was calculated by difference between the crude fiber and the cellulose contents. The contents of chlorogenic acid, expressed as phenols, both on solid and on liquid materials, was determined in accordance with Bittoni et al., (1977), Rivista Italiana Sostanze Grasse, 54, 421. The Nitrogen solubility Index, or NSI, on solid materials was measured at a pH of 9.5 (and at a pH of 7.0) according to the AOCS (Analytical Oil Chemists Society) (1969), Ba 11-65 method.

The Protein Dispersibility Index, or PDI, on the solid materials was measured according to AOCS, 1969, Ba 10-65 method.

A further object of the present invention is to provide an apparatus for extraction as shown in FIG. 1. This apparatus comprises a vessel in which there is a separator 6, for the solids to be extracted. This separator can have a variable shape and geometry (plug, cylinder, star-shaped, spherical and others) and must have perforations (meshes) of a variable size, such as to retain the maximum possible quantity of solids consistently with the free flow of the fluid solvent therethrough. Stated another way, it will act like a sieve and a fraction of the solids will pass through it as entrained by the solvent stream. In the interior of the vessel, a single-blade or plural blade stirrers 8 will be placed also, its RPM being variable. The solvent is fed generally from below, whereas the discharge takes place in correspondence with the filtering, or, better to speak, screening member. Appropriate ports for feeding and discharging the solids will be provided in the top and the bottom section of the vessel, respectively. A wavebreaking diaphragm will be placed in the interior of the vessel. The mesh diameter of the screen and the material it is made of differ according to the type of extraction to be carried out, in that they are principally a function of the type of solvent used and the degree of comminution of the solids.

Having reference to FIG. 1 again, which reports a particular scheme of the reactor, the following are the reference numerals for the several component parts: 1 is the extraction solvent feed, 2 is the solids feed, 3 the discharge of extraction solvent, 4 the feed of clean solvent, 5 the discharge of extracted solids, 6 the filtering element, 7 is the wavebreaking diaphragm, 8 the stirrer, PI a pressure gauge, ME an electric motor.

EXAMPLE 1

EXTRACTION OF LIPIDS FROM SUNFLOWER DEHULLED SEEDS, UNIFLOR 70 CULTIVAR

Preparing the dehulled seed meal - The dehulled sunflower seeds, of the Uniflor 70 Cultivar, having the chemical composition reported in TABLE I, come from a total dehulling operation and were then milled to a thickness of 0.25 mm in a Diefenbach mill. Such material was extracted with a solvent without any further processing.

Extraction of lipids - The extraction has been carried out in the extractor of FIG. 1 and the processing conditions were as follows:

Material feed: 2.5 kg of flakes of sunflower seeds were fed to the generally indicated extractor, having a volume of 15 liters. The extraction solvent was nor hexane. Stirring intensity was 0.8 kW/m$^3$. Temperature: 35° C. Extraction time: 6 hours. Rate of flow of the extraction solvent: 12.5 liters an hour. Rate of flow of the recycled solvent: 12.5 liters an hour. Filtering element: a stainless steel gauze having a mesh diameter of 25 microns.

The quantities of flake slurry to be extracted, prepared as described above, were fed at time intervals of one hour in rotational sequence to each extractor. The number of extractor used was 6. Under stead conditions, 1 kg of flakes of sunflower seeds was extracted with 5 liters of solvent. About the 10% of the material to be extracted having a particulate size of less than 25 micron, was entrained by the extraction solvent through the meshes of the filtering element. Such material coming from the extractor concerned was recycled to the storage vessel together with the corresponding defatted complementary meal. The defatted sunflower meals recovered from the discharges of each extractor were stripped of the solvent in a vacuum oven at 25° C. The determinations relative to proteins, lipids, moisture, chlorogenic acid (in terms of phenols), lignin, cellulose, sugars and ash were effected in duplicate, according to the methods reported above, on samples of defatted meal drawn during a processing run of 48 hours.

The results of the analyses as reported in TABLE 1 show a contents of residual lipids below 2% and a value of NSI (Nitrogen Solubility Index) at pH 9.5 of 77.5%.

TABLE 1
EXTRACTION OF LIPIDS FROM DEHULLED SUNFLOWER SEEDS

| Materials & Chemical Composition | Seeds kg/h | Seeds wt. % | SOLVENT kg/h | SOLVENT wt. % | Defatted & hexane-free meal kg/h | Defatted & hexane-free meal wt. % | Exhausted solvent kg/h | Exhausted solvent wt. % |
|---|---|---|---|---|---|---|---|---|
| Proteins (N × 6.25) | 0.517 | 21.28 | | | 0.517 | 58.75 | | |
| Lipids | 1.564 | 64.42 | | | 0.016 | 1.80 | 1.55 | 15.8 |
| Phenols | 0.057 | 2.34 | | | 0.057 | 6.46 | | |
| Cellulose | 0.044 | 1.83 | | | 0.044 | 5.06 | | |
| Lignin | 0.005 | 0.19 | | | 0.005 | 0.52 | | |
| Sugars | 0.079 | 3.26 | | | 0.079 | 9.00 | | |
| Ash | 0.065 | 2.68 | | | 0.065 | 7.40 | | |
| Hexane | | | 8.25 | 100 | | | 8.25 | 84.2 |
| Non-Nitrogenous extr. | 0.099 | 4.00 | | | 0.112 | 11.01 | | |
| Total on dry matter | 2.430 | 100.00 | 8.25 | 100 | 0.880 | 100.00 | 9.80 | 100.0 |
| H$_2$O | 0.070 | 2.79 | | | 0.082 | 9.28 | | |
| NSI (at pH 9.5) | | | | | | 77.50 | | |

EXAMPLE 2

EXTRACTION OF LIPIDS FOR PARTIALLY DEHULLED SOYBEAN SEEDS

Preparation of seeds - Partially dehulled soybean seeds of the ADA variety, were supplied by the Olii & Risi S.p.A., of Aprilia, Italy; the chemical composition is reported in TABLE 2. Such seeds, prior to the extraction of the lipids, were conditioned at 70° C. in an oven for 30 minutes and then milled in a Diefenbach mill to flakes 0.25 mm thick.

Extraction of lipids - It has been carried out by using the extractor and the processing diagram of EXAMPLE 1 under the following conditions:

Material feed: 5 kg of soybean flakes prepared as above, were fed to the extractor having a volume of 15 liters.
Extraction solvent: nor hexane
Stirring intensity: 1.0 kW/m$^3$
Temperature: 35° C.-Extraction time: 3 hours
Rate of flow of the extraction solvent: 20 liters an hour
Rate of flow of the recycled solvent: 22 liters an hour
Filtering element: a stainless steel gauze with mesh openings of 125 microns.

The quantity of flakes to be extracted, prepared as described above, was fed at 30-minute time intervals in rotational sequence for each extractor. The number of extractors used was 6.

Under steady conditions, 1 kg of flakes (soybean) was extracted with 2 liters of solvent. About 10% of the material to be extracted having a particulate size of less than 125 microns, was entrained by the solvent through the filter meshes.

Such a material coming from an extractor was recycled to the storage vessel together with the corresponding complementary defatted meal.

The defatted soybean meals recovered from the discharges of each extractor were stripped of the solvent in a vacuum oven at 25° C.

The determinations relative to proteins, lipids, moisture, lignin, cellulose, sugars and ash were effected in duplicate according to the method listed above, on samples of defatted meal taken during a process run of 72 hours.

The results of the analyses as reported in TABLE 2 indicate a contents of residual lipids of less than 1.3% and a value of NSI (Nitrogen Solubility Index) at a pH of 9.5 as high as 86.7%.

TABLE 2

EXTRACTION OF LIPIDS FROM PARTIALLY DEHULLED SOYBEAB SEEDS

| Materials & Chemical Composition | Seeds Dry | | Solvent | | Defatted & hexane-free meal dry | | Exhausted solvent | |
|---|---|---|---|---|---|---|---|---|
| | kg/h | wt. % | kg/h | wt. % | kg/h | wt. % | kg/h | wt. % |
| Proteins (N × 6.25) | 3.668 | 41.55 | | | 3.668 | 53.06 | | |
| Lipids | 2.004 | 22.70 | | | 0.090 | 1.29 | 1.92 | 15.5 |
| Cellulose | 0.290 | 3.29 | | | 0.286 | 4.20 | | |
| Lignin | 0.028 | 0.31 | | | 0.028 | 0.40 | | |
| Sugars | 0.822 | 9.32 | | | 0.822 | 11.90 | | |
| Ash | 0.484 | 5.48 | | | 0.484 | 7.00 | | |
| Hexane | | | 10.50 | 100 | | | 10.50 | 84.5 |
| Non-nitrogenous extr. | 1.534 | 17.35 | | | 1.532 | 22.15 | | |
| Total on dry matter | 8.830 | 100.00 | 10.50 | 100 | 6.910 | 100.00 | 12.42 | 100.0 |
| $H_2O$ | 1.170 | 11.70 | | | 0.930 | 11.85 | | |
| NSI pH 9.5 | | | | | | 86.69 | | |

EXAMPLE 3

EXTRACTION OF CHLOROGENIC ACID AND SOLUBLE SUGARS FROM DEFATTED SUNFLOWER MEAL FOR THE PREPARATION OF PROTEINIC CONCENTRATES.

Preparation of defatted sunflower seed meal-The defatted sunflower seed meal was prepared as described in EXAMPLE 1 and using the stream 9 of the seed dehulled according to the industrial method of Bühler.

The chemical composition of the meal is reported in TABLE. 3.

Extraction of the undesirable components-It has been carried out with the extractor of FIG. 1 under the following conditions:

Materials feed:1.0 kg of defatted sunflower seed meal was fed to an extractor of the capacity of 15 liters.
Extraction solvent: ethanol-water in the ratio of 72:28 by vol.
Stirring intensity: 1.0 kW/m³
Temperature: 25° C.-Extraction time: 3 hours
Rate of flow of the extraction solvent: 15 liters an hour
Rate of flow of the recycled solvent: 20 liters an hour
Filtering element: stainless steel gauze with mesh openings 44 micron wide The quantities of meal to be extracted were fed at time intervals of half an hour in rotation sequence for each extractor.

The extractors were in a number of 6. Under steady conditions, one kilogram of sunflower seed meal was extracted with 7.5 liters of solvent. About 10% of the materials to be extracted, having a particulate size of less than 44 microns was entrained by the extraction solvent through the meshes of the filtering element. Such material, coming from an extractor, was recycled in the storage vessel together with the corresponding complementary meal stripped of its undesirable components. The product thus obtained (a proteinic concentrate due to its proteinic contents) was dried in a vacuum oven at 25° C. The contents of the chemical components relative to proteins, chloroganic acid (in terms of phenols), crude fiber, sugars, and NSI at pH 9.5 was measured in duplicate according to the methods reported above, on samples of proteinic concentrate taken during a 48-hour processing run.

The results of the analyses are tabulated in TABLE 3 and give a contents of chlorogenic acid (expressed in terms of phenols) of 0.29% and a protein contents (N×6.25) of 67% with an NSI at pH 9.5 equal to 71.5%. Extractions of lipids and undesirable substances have also been carried out starting from other seeds, such as cotton seeds, sesame seeds, grape pips, jojoba seeds, peanut seeds, safflower seeds and colza seeds.

TABLE 3

EXTRACTION OF CHLOROGENIC ACID AND SOLUBLE SUGARS FROM DEFATTED SUNFLOWER SEEDS FOR PREPARATION OF A PROTEINIC CONCENTRATE

| Materials % Chemical Composition | Sunflower seeds | | Exhausted solvent | | Proteinic Concentrate | | Solvent | |
|---|---|---|---|---|---|---|---|---|
| | kg/h | dry wt % | kg/h | wt. % | kg/h | dry wt. % | kg/h | wt % |
| Proteins (N × 6.25) | 0.964 | 53.60 | 0.062 | | 0.902 | 67.00 | | |
| Lipids | 0.027 | 1.50 | 0.027 | | | | | |
| Phenols | 0.100 | 5.54 | 0.096 | | 0.004 | 0.29 | | |
| Crude fiber | 0.097 | 5.40 | | | 0.097 | 7.20 | | |
| Sugars | 0.117 | 6.52 | 0.110 | | 0.007 | 0.55 | | |
| Ash | 0.135 | 7.53 | 0.033 | | 0.102 | 7.56 | | |
| Ethanol | | | 7.680 | | | | 7.68 | 67 |
| $H_2O$ | | | 3.780 | | | | 3.78 | 33 |
| Non-nitrogenous extracts | 0.358 | 19.91 | 0.124 | | 0.234 | 17.40 | | |
| Total on dry matter | 1.798 | 100.00 | | | 1.346 | 100.00 | | |
| Total on liquid matter | | | 11.912 | | | | 11.46 | 100 |
| NSI (pH 9.5) | | | | | | 71.50 | | |

EXAMPLE 4

EXTRACTION OF OLIGOSACCHARIDES FROM DEFATTED SOYBEAN SEED MEAL FOR THE PREPARATION OF A PROTEINIC CONCENTRATE.

Preparation of the defatted meal-The defatted soybean meal was prepared as described in EXAMPLE 2 hereof. The chemical composition of the defatted meal is reported on TABLE 4.

Extraction of the undesirable components-This operation has been carried out by the extractor of FIG. 1, under the following conditions:
  Materials feed: 1.5 kg of defatted soybean seed meal was fed to an extractor having a volume of 15 liters.
  Extraction solvent: ethanol-water in the volume ratio of 75:25.
  Stirring intensity: 1.0 kW/m$^3$
  Temperature: 25° C.-Extraction time: 6 hours
  Rate of flow of the extraction solvent: 15 liters an hour
  Rate of flow of the recycled solvent: 13 liters an hour
  Filtering element: a stainless steel wire gauze having a mesh opening of 125 microns.

The quantities of meal to be extracted were fed at time intervals of one hour to each extractor in rotational sequence. The number of extractor used was 6.

Under steady condition one kg of soybean seed meal was extracted with 10 liters of solvent.

About the 10% of the material to be extracted, having a particulate size of less than 125 microns, was entrained by the extraction solvent stream through the meshes of the filtering element. Such a material, coming from an extractor was recycled to the storage vessel together with the corresponding complementary meal stripped of its undesirable components. The product was obtained (a proteinic concentrate due to its high protein contents) was dried in a Viani Model DEVI 4VE 01 dryer.

The contents of chemical components relative to proteins, lipids, moisture, lignin, cellulose, ash, sugars (determined according to the method of Dubois et al., cited above) and NSI at pH 9.5 and at pH 7.0 were determined in duplicate according to the methods cited above on samples of proteinic concentrate taken during progress of a 32-hour processing run.

The results of the analyses are reported on TABLE 4 and indicate a contents of total sugars (according to Dubois et al.) as low as 0.95%, and a contents of proteins (N×6.25) as high as 70.5% with an NSI at pH 9.5 of 66.0% and an NSI at pH 7.0 of 43.6%.

TABLE 4

EXTRACTION OF OLIGOSACCHARIDES FROM DEFATTED SOYBEAN SEED MEAL FOR THE PREPARATION OF A PROTEINIC CONCENTRATE

| Material & Chemical Composition | Soybean seed meal | | Exhausted Solvent | | Proteinic concentrate | | Solvent | |
|---|---|---|---|---|---|---|---|---|
| | kg/h | Dry wt. % | kg/h | wt. % | kg/h | Dry wt. % | kg/h | wt. % |
| Proteins (N × 6.25) | 0.701 | 53.06 | 0.021 | 0.24 | 0.680 | 70.49 | | |
| Lipids | 0.017 | 1.29 | 0.010 | 0.11 | 0.007 | 0.68 | | |
| Cellulose | 0.055 | 4.20 | 0.016 | 0.18 | 0.039 | 4.07 | | |
| Lignin | 0.005 | 0.40 | 0.000 | 0.00 | 0.005 | 0.52 | | |
| Sugars* | 0.229 | 17.30 | 0.22 | 2.51 | 0.009 | 0.95 | | |
| Ash | 0.092 | 7.00 | 0.044 | 0.50 | 0.048 | 5.03 | | |
| Ethanol | | | 5.900 | 67.38 | | | 5.9 | 70 |
| H$_2$O | | | 2.500 | 28.56 | | | 2.5 | 30 |
| Non-nitrogenous extracts | 0.223 | 16.75 | 0.046 | 0.52 | 0.177 | 18.26 | | |
| Total on dry matter | 1.322 | 100.00 | | | 0.965 | 100.00 | | |
| Total on liquid matter | | | 8.757 | | | | 8.4 | 100 |
| NSI pH 9.5 | | 86.69 | | | | 66.00 | | |
| NSI pH 7.0 | | 82.37 | | | | 43.58 | | |
| PDI | | 95.15 | | | | 44.58 | | |

*Determined according to Dubois et al. (1956), Anal. Chem. 28, 350

EXAMPLE 5

EXTRACTION OF CHLOROGENIC ACID AND SUGARS FROM DEFATTED SUNFLOWER SEED MEAL IN AN AQUEOUS SOLUTION AT AN ACIDIC pH.

Preparation of the defatted sunflower seed meal-The defatted sunflower seed meal was prepared as disclosed in EXAMPLE 1 hereof using the stream 9 of the dehulled seeds, dehulling being carried out according to the Bühler industrial procedure.

The chemical composition of the defatted meal is reported in TABLE 5.

Extraction of the undesirable components-This operation has been carried out by the extractor of FIG. 1 under the following conditions:
  Material feed: 1.0 kg of defatted sunflower seed meal was fed in an extractor having a 15 liter volume.
  Extraction solvent: Water adjusted at a pH of 3.5 with 4-normal formic acid.
  Stirring intensity: 1.0 kW/m$^3$
  temperature: 25° C.-Extraction time: 3 hours
  Rate of flow of the recycled solvent: 20 liters an hour
  Filtering element: a stainless steel gauze with mesh openings of 44 microns.

The quantities of meal to be subjected to extraction were fed at time intervals of half an hour in each extractor. The number of extractor used was 6. Under steady conditions, one kilogram of sunflower seed meal was extracted with 7.5 liters of water. About the 10% of the material to be subjected to extraction, having a particulate size of less than 44 microns, was entrained by the extraction solvent stream through the meshes of the filtering element. Such material, coming from one of the extractors, was recycled to the storage vessel together with the corresponding complementary meal stripped of its undesirable components and the pH was adjusted to 5.0 with double-normal NaOH. The product thus obtained, a proteinic concentrate due to its high contents of proteins, was milled in a Fryma colloidal mill and dried in a Spraydrier Minor of Niro Atomizer. The contents of chemical components relative to proteins, lipids, moisture, crude fiber, ash, sugars and NSI at pH 9.5 were determined in duplicate according to the methods reported above, on samples of proteinic concentrate, taken during progress of a 32 hour run.

The results of the analyses are reported on TABLE 5 and give a contents of chlorogenic acid (expressed in terms of phenols) as low as 0.45% and a contents of proteins (N×6.25) as high as 64% with an NSI at pH 7.0 equal to 58%.

TABLE 5

EXTRACTION OF CHLOROGENIC ACID AND SUGARS FROM DEFATTED SUNFLOWER SEED MEAL IN AN AQUEOUS SOLUTION AT AN ACIDIC pH

| Material & Chemical Composition | Sunflower seed meal | | Exhausted solvent | | Proteinic concentration | | Solvent | |
|---|---|---|---|---|---|---|---|---|
| | kg/h | dry wt. % | kg/h | wt. % | kg/h | dry wt. % | kg/h | wt. % |
| Proteins (N × 6.25) | 0.964 | 53.60 | 0.253 | 1.61 | 0.711 | 63.90 | | |
| Lipids | 0.027 | 1.50 | 0.018 | 0.11 | 0.009 | 0.85 | | |
| Phenols | 0.100 | 5.54 | 0.095 | 0.60 | 0.005 | 0.45 | | |
| Crude fiber | 0.097 | 5.40 | 0.012 | 0.08 | 0.085 | 7.64 | | |
| Sugars | 0.117 | 6.52 | 0.113 | 0.73 | 0.004 | 0.36 | | |
| Ash | 0.135 | 7.53 | 0.062 | 0.39 | 0.073 | 6.52 | | |
| H$_2$O | | | 15.000 | 95.63 | | | 15.0 | 100 |
| Non-nitrogenous extracts | 0.358 | 19.91 | 0.132 | 0.85 | 0.226 | 20.28 | | |
| Total on dry matter | 1.798 | 100.00 | | | 1.113 | 100.00 | | |
| Total on liquid matter | | | 15.685 | 100.00 | | | 15.0 | 100 |
| NSI at pH 7.0 | | | | | | 58.0 | | |

We claim:

1. In a solid-liquid extraction process wherein undesirable solvent-soluble substances are extracted from an oily seed mixture containing same by treating the oily seed mixture with a solvent or mixture of solvents in a number of interconnected reactors, the improvement which comprises providing a plurality of interconnecting reactors, each having filter means and stirring means therein, and carrying out the following steps:

feeding the oily seed mixture to be extracted into each of the reactors at the initiation of the process and periodically and in rotational sequence as the exhausted oily seed mixture is discharged from a reactor;

continuously and serially circulating solvent through the interconnected reactors for extraction from the oily seed mixture in each reactor;

periodically and separately feeding fresh solvent into the reactor containing the most exhausted oily seed mixture and discharging said solvent from the reactor containing the least exhausted oily seed mixture;

filtering the solids from the solvent in the midst of solid-liquid extraction process taking place within each reactor by filtering means extending thereinto which prevent solids from passing through the filtering member so that filtered solids remain in the reactor as the solvent containing any remaining solids is being discharged through the filter means and from one reactor and circulated to the next reactor;

stirring the solvent and oily seed mixture by contacting same with stirring means present in each reactor to keep the filtering means essentially clean of filtered solids as a result of whirling motion of the oily seed mixture and solvent induced by the stirring action; and periodically discharging the exhausted oily seed mixtures in rotational sequence from the reactors.

2. The process for the solid-liquid extraction according to claim 1 wherein the process is carried out at a temperature not in excess of about 35° C.

3. The process for the solid-liquid extraction according to claim 1, wherein the solvent is fed to the reactors and drawn therefrom at a specific rate of flow from between about 2 cubic meters per hour and per square meter and about 15 cubic meters per hour and per square meter.

4. The process for the solid-liquid extraction according to claim 1, wherein the oily seed mixture are vegetable tissues which contain liquids, undesirable substances and/or toxic substances.

5. The process for the solid-liquid extraction according to claim 1, wherein the liquid phase consists of at least one member selected from an organic solvent, an inorganic solvent and a mixture of the two.

6. The process for the solid-liquid extraction according to claim 1, wherein the separating member has a geometrical configuration with meshes having an opening width of from 1 to 200 microns.

* * * * *